US012717861B2

(12) United States Patent
Lin et al.

(10) Patent No.: US 12,717,861 B2
(45) Date of Patent: Aug. 25, 2026

(54) METHOD AND SYSTEM FOR DELIVERING CONTENT TO A SLOT OF A WEB PAGE

(71) Applicant: WP Company LLC, Washington, DC (US)

(72) Inventors: Hongliang Eric Lin, Flushing, NY (US); Jarrod Dicker, Hoboken, NJ (US)

(73) Assignee: WP Company LLC, Washington, DC (US)

( * ) Notice: Subject to any disclaimer, the term of this patent is extended or adjusted under 35 U.S.C. 154(b) by 117 days.

(21) Appl. No.: 15/714,674

(22) Filed: Sep. 25, 2017

(65) Prior Publication Data

US 2018/0088744 A1 Mar. 29, 2018

Related U.S. Application Data

(60) Provisional application No. 62/400,056, filed on Sep. 26, 2016.

(51) Int. Cl.

*G06F 16/957* (2019.01)
*G06F 3/0481* (2022.01)
*G06F 3/0485* (2022.01)
*G06Q 30/0241* (2023.01)
*G06Q 30/0273* (2023.01)

(Continued)

(52) U.S. Cl.

CPC ........ *G06F 16/9574* (2019.01); *G06F 3/0481* (2013.01); *G06F 3/0485* (2013.01); *H04L 65/60* (2013.01); *H04L 67/02* (2013.01); *G06Q 30/0275* (2013.01); *G06Q 30/0277* (2013.01); *G09G 2370/027* (2013.01)

(58) Field of Classification Search

CPC .......................... G06F 16/9574; G06F 3/0485

See application file for complete search history.

(56) References Cited

U.S. PATENT DOCUMENTS 5,848,396 A * 12/1998 Gerace .................. G06Q 30/02 705/7.33
6,907,566 B1 * 6/2005 McElfresh ............ G06Q 30/02 715/210

(Continued)

FOREIGN PATENT DOCUMENTS

CN 102279854 A * 12/2011 ............ G06F 17/30
CN 105933741 A 9/2016

(Continued)

OTHER PUBLICATIONS

Flynn, Kerry “End of an era: Google is ditching the DoubleClick name”, Jun. 27, 2018, Digiday. (Year: 2018).*

(Continued)

*Primary Examiner* — Tamara T Kyle
*Assistant Examiner* — Tyler Schallhorn
(74) *Attorney, Agent, or Firm* — Wilmer Cutler Pickering Hale and Dorr LLP

(57) ABSTRACT

Techniques for content delivery are disclosed. In accordance with one embodiment, the techniques may be realized as a method of content delivery comprising determining a slot of a webpage, determining a display area of a web browser displaying the webpage, determining a distance from the slot to a location of the display area, and comparing the distance to a first threshold, wherein the distance may be measured in pixels.

24 Claims, 6 Drawing Sheets

(51) Int. Cl.
*H04L 65/60* (2022.01)
*H04L 67/02* (2022.01)

(56) References Cited

U.S. PATENT DOCUMENTS 7,100,111 B2 * 8/2006 McElfresh ............. G06Q 30/02 715/207
7,373,599 B2 * 5/2008 McElfresh ............. G06Q 30/02 715/210
7,398,463 B2 * 7/2008 Bernstein ................ G06F 40/10 707/E17.116
7,703,010 B2 * 4/2010 Bernstein .............. G06F 40/143 717/104
7,840,906 B2 * 11/2010 Villers ..................... G09G 5/34 715/785
7,962,547 B2 * 6/2011 Kern ....................... G06F 16/95 709/217
8,005,717 B2 * 8/2011 Joo .................... G06Q 30/0277 705/14.73
8,314,809 B1 * 11/2012 Grabowski ............. G06T 15/20 345/548
8,326,922 B2 * 12/2012 Kern ......................... H04L 9/40 709/217
8,356,247 B2 * 1/2013 Krassner ................. G06F 40/14 715/234
8,384,726 B1 * 2/2013 Grabowski ............. G06T 15/20 345/548
8,402,368 B2 * 3/2013 Bernstein .............. G06F 16/986 715/235
8,521,588 B2 * 8/2013 McElfresh ......... G06Q 30/0254 705/14.43
8,595,160 B2 * 11/2013 Whelan ............. G06Q 30/0257 706/14
8,660,976 B2 * 2/2014 Vasquez Lopez ..... G06N 5/025 706/48
8,689,117 B1 * 4/2014 Vasilik ................ G06F 16/9577 715/229
8,738,448 B2 * 5/2014 Zhang ................ G06Q 30/0241 705/14.73
8,755,771 B2 * 6/2014 Miyazaki .............. H04W 12/06 455/418
8,769,402 B2 * 7/2014 Svensson ............... G06Q 30/00 715/243
8,826,141 B2 * 9/2014 Dimitrov .............. G06F 3/0481 715/738
8,904,277 B2 * 12/2014 Kroger .................. G06F 40/117 715/234
9,076,162 B2 * 7/2015 McElfresh ......... G06Q 30/0201
9,183,319 B2 * 11/2015 Joel ........................... G06T 3/40
9,424,345 B1 8/2016 Sanio et al.
9,535,887 B2 * 1/2017 Ozgul ................... G06F 40/106
9,565,265 B2 * 2/2017 Joel ........................... G06T 3/40
9,569,083 B2 * 2/2017 Pimmel ............... G06F 16/9535
9,575,998 B2 * 2/2017 Shapiro ................... G06F 16/54
9,621,866 B2 * 4/2017 Ito .......................... H04N 7/163
9,672,540 B2 * 6/2017 Zhang ................ G06Q 30/0241
9,779,412 B2 * 10/2017 McElfresh ......... G06Q 30/0254
9,779,413 B2 * 10/2017 McElfresh ......... G06Q 30/0277
9,779,414 B2 * 10/2017 McElfresh ......... G06Q 30/0247
9,779,415 B2 * 10/2017 McElfresh ......... G06Q 30/0255
9,785,332 B1 * 10/2017 Karppanen ........... G06F 3/0485
9,785,723 B2 * 10/2017 Bernstein ................ G06F 8/427
9,792,385 B2 * 10/2017 Artz .................... G06F 16/9574
9,817,822 B2 * 11/2017 Chakra ................... G06F 16/00
9,824,074 B2 * 11/2017 Krassner ................ G06F 40/14
9,830,399 B2 * 11/2017 Bernstein ............... G06F 16/986
9,922,347 B1 * 3/2018 Burcham ........... G06Q 30/0242
10,009,662 B2 * 6/2018 Kang ................... H04N 21/251
10,051,029 B1 * 8/2018 Amberden .............. H04L 67/02
10,175,873 B2 * 1/2019 Desai .................... G06F 3/0485
10,176,484 B2 * 1/2019 Dilling .................... G06Q 30/02
10,313,905 B2 * 6/2019 Lau ........................ H04W 24/10
10,356,454 B1 * 7/2019 Lewis .............. H04N 21/44209
10,380,218 B2 * 8/2019 Dodeja ................. G06F 40/117
10,430,840 B2 * 10/2019 VanDuyn ............ G06F 3/04855
10,467,186 B2 * 11/2019 Chakra ................... G06F 16/00
10,891,634 B2 * 1/2021 Dilling ................... G06Q 30/02
10,965,763 B2 * 3/2021 Green ................... G06F 16/958
11,210,708 B2 * 12/2021 Snyder ............... G06Q 30/0276
2003/0014443 A1 * 1/2003 Bernstein ................ G06F 8/427 707/E17.116
2004/0128346 A1 7/2004 Melamed et al.
2005/0071758 A1 * 3/2005 Ehrich .................... G06F 9/451 715/234
2006/0206380 A1 * 9/2006 Joo .................... G06Q 30/0251 705/14.49
2008/0065721 A1 * 3/2008 Cragun .................. G06Q 30/02 709/203
2008/0097834 A1 * 4/2008 McElfresh ......... G06Q 30/0244 705/7.29
2008/0294682 A1 * 11/2008 Bernstein .............. G06F 40/143 707/999.102
2008/0306824 A1 * 12/2008 Parkinson .......... G06Q 30/0277 705/14.73
2009/0055725 A1 * 2/2009 Portnov ................. G06Q 30/02 715/234
2009/0106687 A1 * 4/2009 De Souza Sana .... G06F 3/0481 715/784
2009/0193147 A1 7/2009 Lepeska
2009/0281889 A1 * 11/2009 Derosa-Grund ....... G06Q 30/00 705/14.25
2009/0287572 A1 * 11/2009 Whelan ............. G06Q 30/0277 705/14.55
2010/0057566 A1 * 3/2010 Itzhak ................ G06Q 30/0255 705/14.53
2010/0122206 A1 * 5/2010 Matsue .............. H04N 1/00129 715/785
2010/0153544 A1 * 6/2010 Krassner ............. G06F 16/9577 709/224
2010/0153836 A1 * 6/2010 Krassner ................. H04L 67/36 715/234
2010/0162099 A1 * 6/2010 Bernstein .............. G06F 16/958 709/219
2010/0162126 A1 * 6/2010 Donaldson ............. G09G 5/346 715/738
2010/0174774 A1 * 7/2010 Kern ......................... H04L 9/40 709/203
2010/0211467 A1 * 8/2010 Ramanathan ......... G06F 16/957 705/14.72
2010/0241497 A1 * 9/2010 Rittman ............. G06Q 30/0241 705/14.5
2010/0325533 A1 * 12/2010 Artz .................... G06F 16/9574 715/235
2011/0082755 A1 * 4/2011 Itzhak ................ G06Q 30/0277 705/14.69
2011/0154185 A1 * 6/2011 Kern ......................... H04L 9/40 715/234
2011/0178973 A1 * 7/2011 Lopez ................... G06F 40/166 706/48
2011/0202847 A1 * 8/2011 Dimitrov .............. G06F 3/0481 715/738
2011/0231242 A1 * 9/2011 Dilling ............... G06Q 30/0275 705/14.42
2011/0231264 A1 * 9/2011 Dilling ............... G06Q 30/0275 705/14.71
2011/0264509 A1 * 10/2011 McElfresh ......... G06Q 30/0277 705/14.42
2011/0264510 A1 * 10/2011 McElfresh ......... G06Q 30/0246 705/14.42
2011/0276411 A1 * 11/2011 McElfresh ......... G06Q 30/0201 705/14.66
2012/0054596 A1 * 3/2012 Kroger .................. G06F 40/106 715/234
2012/0159311 A1 * 6/2012 Hanssen ............... H04L 67/322 715/243
2012/0302210 A1 * 11/2012 Miyazaki .............. H04W 12/06 455/411
2013/0050249 A1 * 2/2013 Grabowski ............. G06T 15/20 345/619

(56) References Cited

U.S. PATENT DOCUMENTS

2013/0198608 A1* 8/2013 Krassner ................ G06F 40/14 715/234
2013/0204715 A1* 8/2013 Zhang ................ G06Q 30/0277 705/14.73
2013/0219005 A1 8/2013 Kotecha et al.
2014/0108941 A1* 4/2014 Joel ................ G06T 3/40 715/738
2014/0108969 A1* 4/2014 Joel ................ G06T 3/40 715/760
2014/0122994 A1* 5/2014 Beckmann ................ G06F 16/54 715/234
2014/0122995 A1* 5/2014 Beckmann ................ G06F 16/958 715/234
2014/0136337 A1* 5/2014 Ringdahl ................ G06Q 30/0275 705/14.71
2014/0136341 A1* 5/2014 Ringdahl ................ G06Q 30/0275 705/14.71
2014/0136343 A1* 5/2014 Ringdahl ................ G06Q 30/0275 705/14.71
2014/0164923 A1* 6/2014 Georgiev ................ G06F 3/0485 715/716
2014/0164985 A1* 6/2014 Pimmel ................ G06F 16/9535 715/784
2014/0165001 A1* 6/2014 Shapiro ................ G06F 16/54 715/811
2014/0180801 A1* 6/2014 Homsany ................ G06Q 30/0241 705/14.49
2014/0208259 A1* 7/2014 Desai ................ G06F 3/04883 715/784
2014/0245125 A1* 8/2014 Ozgul ................ G06F 40/106 715/234
2014/0282205 A1* 9/2014 Teplitsky ................ G06Q 30/0641 715/776
2014/0344663 A1* 11/2014 Joel ................ G06F 17/2264 715/234
2015/0040000 A1* 2/2015 Rice ................ G06F 40/143 715/235
2015/0113366 A1* 4/2015 Bernstein ................ G06F 16/9574 715/202
2015/0128033 A1* 5/2015 Li ................ G06F 40/146 715/242
2015/0154661 A1 6/2015 Chakrabarti et al.
2015/0205883 A1* 7/2015 Bernstein ................ H04L 67/1097 715/234
2015/0206199 A1* 7/2015 Zhang ................ G06Q 30/0277 705/14.73
2015/0254732 A1* 9/2015 Snyder ................ G06Q 30/0276 705/14.72
2015/0324869 A1 11/2015 Harding et al.
2015/0341459 A1* 11/2015 Joel ................ G06F 17/2264 709/203
2015/0365306 A1 12/2015 Chaudhri et al.
2016/0036930 A1* 2/2016 Green ................ H04L 67/535 709/224
2016/0065684 A1* 3/2016 Joel ................ G06T 3/40 709/203
2016/0078145 A9* 3/2016 Bernstein ................ G06F 40/10 715/234
2016/0112894 A1* 4/2016 Lau ................ H04W 24/10 370/252
2016/0277777 A1* 9/2016 Kimura ................ H04N 21/458
2016/0295299 A1* 10/2016 Kang ................ H04N 21/458
2016/0342574 A1* 11/2016 Zhang ................ G06F 40/12
2016/0364748 A1* 12/2016 Paul ................ G06Q 30/0247
2017/0053325 A1* 2/2017 VanDuyn ................ G06F 3/0485
2017/0178012 A1* 6/2017 Borza ................ G06F 16/9574
2017/0270085 A1* 9/2017 Dodeja ................ G06F 16/986
2018/0011944 A1* 1/2018 Artz ................ G06F 16/9574
2018/0018697 A1* 1/2018 Park ................ G06Q 30/0251
2019/0164175 A1* 5/2019 Dilling ................ G06Q 30/02
2019/0205924 A1* 7/2019 Rusiecki ................ G06Q 30/0276
2020/0019999 A1* 1/2020 VanDuyn ................ G06F 3/04855

FOREIGN PATENT DOCUMENTS

CN 105072462 B 8/2018
JP 2011-128204 A 6/2011
JP 2016-062417 A 4/2016
JP 2017054519 A * 3/2017 ................ G06Q 30/02
WO WO-2014/014430 1/2014
WO WO-2016/049176 A1 3/2016

OTHER PUBLICATIONS

Keith, Ben. "Introducing the Super Cool Ad Inserter Plugin For WordPress", Jun. 17, 2016 INN Labs. (Year: 2016).*
Extended European Search Report dated Apr. 23, 2020 received in related European Patent Application No. 17854076.1 (8 pages).
Notice of Reasons for Rejection dated Jun. 8, 2021 received in related Japanese Patent Application No. 2019-516207 (17 pages).
Extended European Search Report dated Jul. 27, 2022, received in related European Patent Application No. 20741172.9 (11 pages).
International Search Report and Written Opinion dated Dec. 5, 2017, in related International Application No. PCT/US17/53261, 9 pages.

* cited by examiner

200

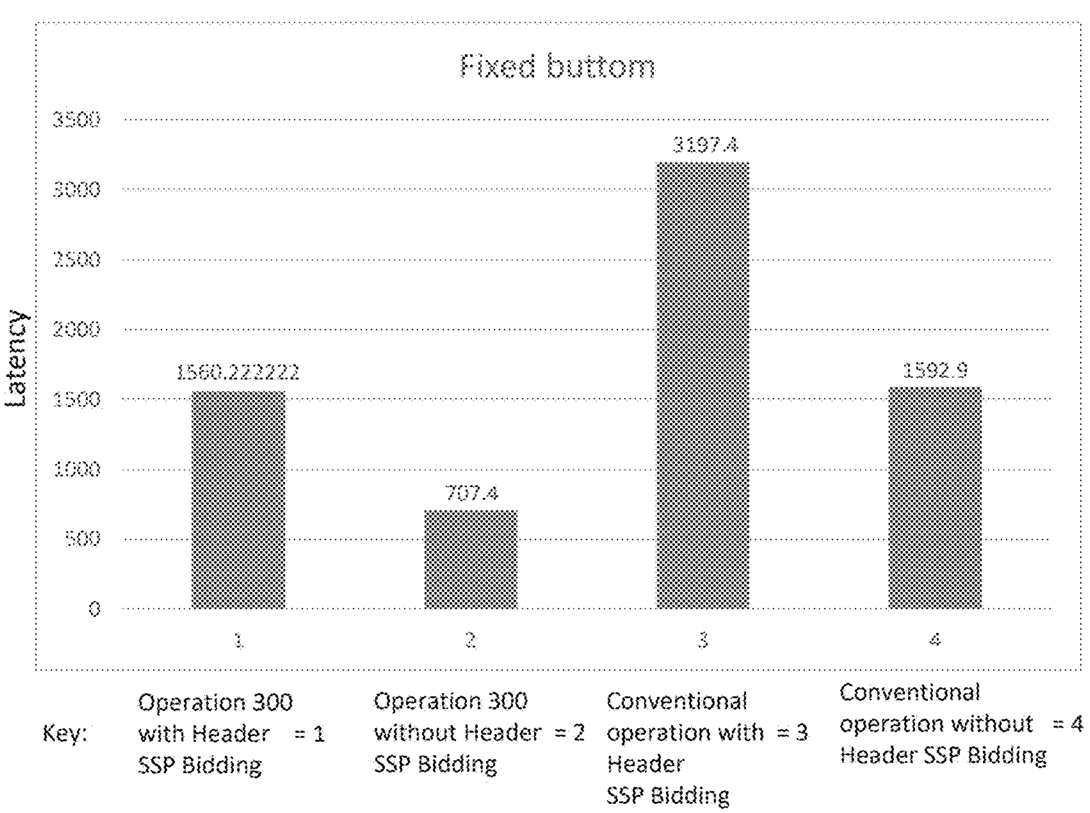

Key: Operation 300 with Header SSP Bidding = 1; Operation 300 without Header SSP Bidding = 2; Conventional operation with Header SSP Bidding = 3; Conventional operation without Header SSP Bidding = 4

FIG. 4A

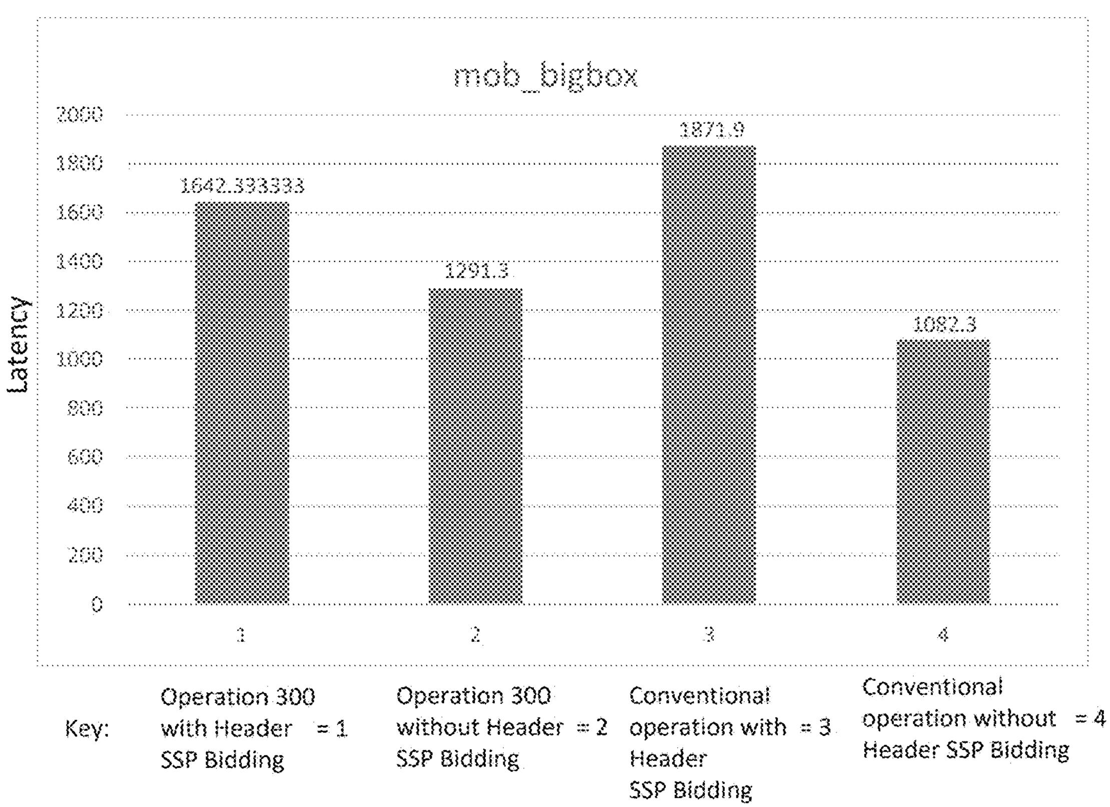

Key: Operation 300 with Header SSP Bidding = 1; Operation 300 without Header SSP Bidding = 2; Conventional operation with Header SSP Bidding = 3; Conventional operation without Header SSP Bidding = 4

FIG. 4B

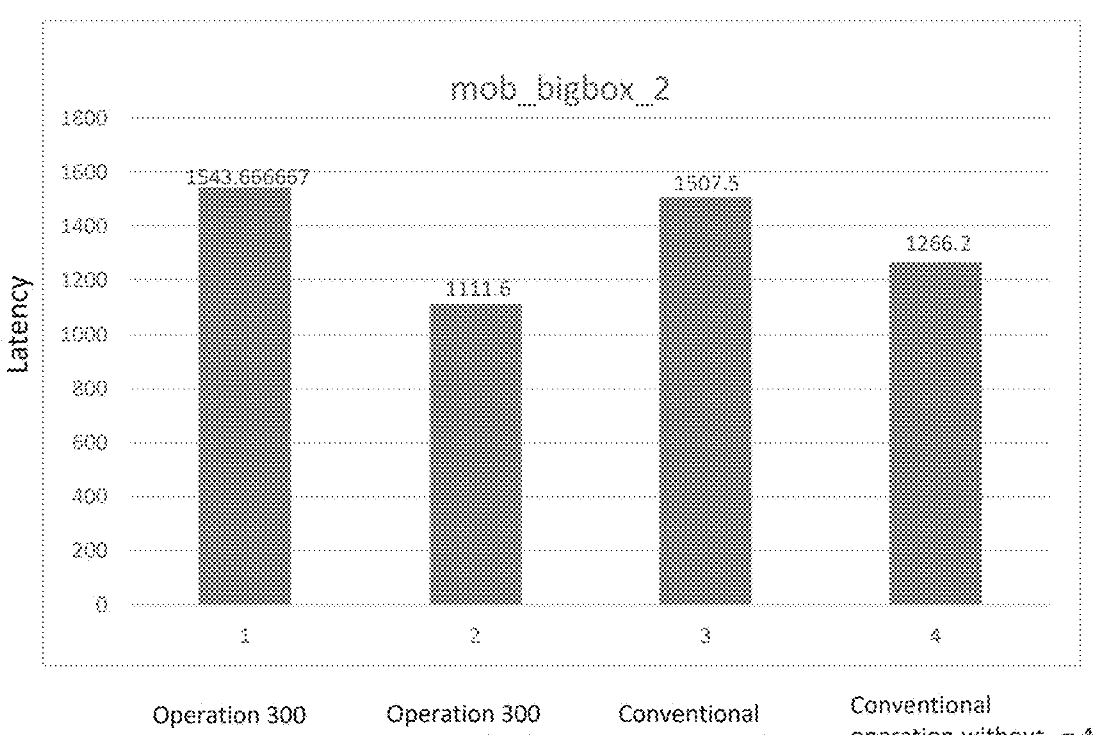

Key: Operation 300 with Header SSP Bidding = 1; Operation 300 without Header SSP Bidding = 2; Conventional operation with Header SSP Bidding = 3; Conventional operation without Header SSP Bidding = 4

FIG. 4C

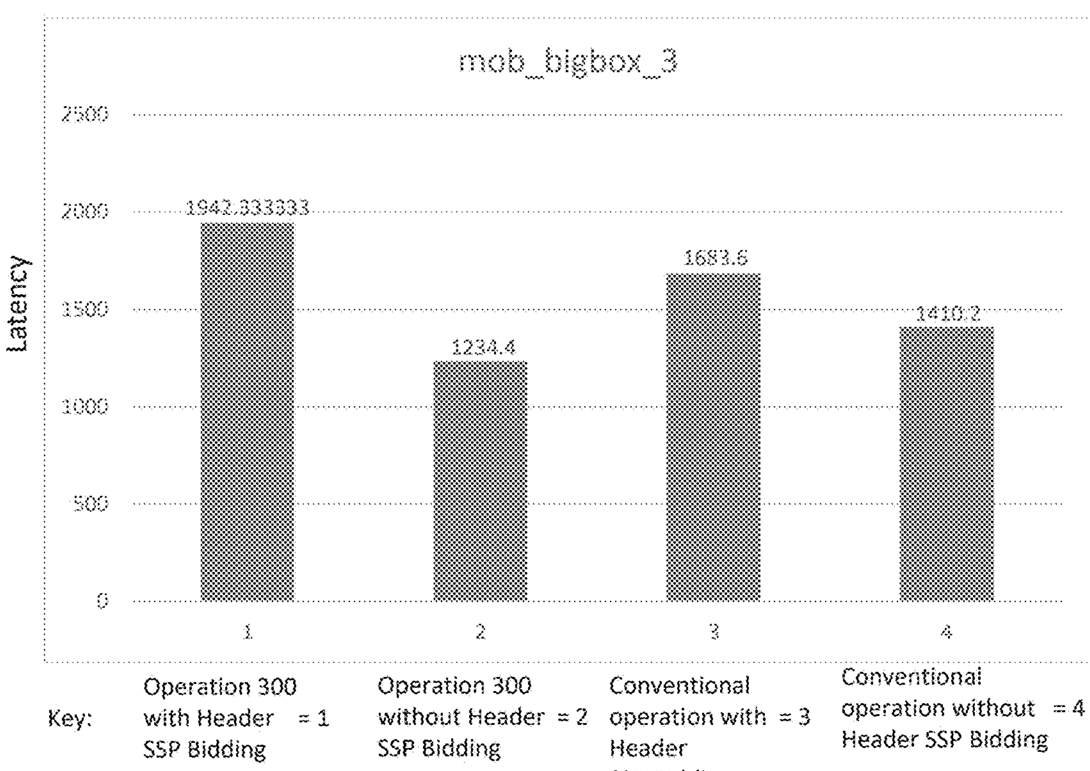

Key: Operation 300 with Header SSP Bidding = 1; Operation 300 without Header SSP Bidding = 2; Conventional operation with Header SSP Bidding = 3; Conventional operation without Header SSP Bidding = 4

FIG. 4D

METHOD AND SYSTEM FOR DELIVERING CONTENT TO A SLOT OF A WEB PAGE

CROSS-REFERENCE TO RELATED APPLICATIONS

This patent application claims priority to U.S. Provisional Patent Application No. 62/400,056, filed on Sep. 26, 2016, the contents of which are incorporated by reference herein in their entirety.

FIELD OF THE DISCLOSURE

The present disclosure generally relates to computerized real-time and/or near-instant content delivery. More specifically, the present disclosure relates to techniques for providing computerized real-time and/or near-instant advertising content delivery to computing devices.

BACKGROUND OF THE DISCLOSURE

Users of the Internet may obtain essentially real-time news reporting from various websites. For example, users may visit news reporting websites and view webpages that report on different current events. Such webpages may include multimedia content, such as images and streaming video, that reflect the current event or reflect advertisements for viewing by the user. As technology advances, the quality of such content may increase, which may cause the size of such content to increase, and increase loading times of associated webpages. For example, video content may be streamed in high definition and image content may have a high resolution, which may increase the size and loading times of such webpages.

Additionally, users access real-time news reporting from a multitude of different computing devices, such as desktop computers, laptop computers, tablet computers, and mobile phones, for example. Such devices may require that webpages and/or multimedia content have particular display dimensions and resolutions, and may also include other technical requirements. Therefore, compatibility issues may occur, and loading times may again be increased.

Therefore, a need may exist for systems and methods that provide real-time and/or near-instant content delivery and overcome shortcomings associated with conventional processes.

SUMMARY OF THE DISCLOSURE

Techniques for content delivery are disclosed. In accordance with one embodiment, the techniques may be realized as a method of content delivery comprising determining a slot of a webpage, determining a display area of a web browser displaying the webpage, determining a distance from the slot to a location of the display area, and comparing the distance to a first threshold, wherein the distance may be measured in pixels.

In accordance with further aspects of this embodiment, the method may further comprise determining that the distance is greater than the first threshold, wherein when the distance is greater than a first threshold, the slot is outside of the display area.

In accordance with further aspects of this embodiment, the method may further comprise queuing content for delivery to the slot, wherein the content may be delivered to the slot when the distance is determined to be less than the first threshold.

In accordance with further aspects of this embodiment, the method may further comprise determining that the distance is less than or equal to the first threshold, wherein when the distance is less than or equal to the first threshold, the slot is within the display area.

In accordance with further aspects of this embodiment, the method may further comprise delivering content to the slot.

In accordance with further aspects of this embodiment, the distance may be a diagonal distance from an edge of the slot to the location of the display area, wherein the location of the display area may be an edge of the display area.

In accordance with further aspects of this embodiment, the distance may be a diagonal distance from the center of the slot to the location of the display area, wherein the location of the display area may be the center of the display area.

In accordance with further aspects of this embodiment, the distance may be at least one of a vertical and horizontal distance a first location of the slot to the location of the display area.

In accordance with further aspects of this embodiment, the method may further comprise determining that a webpage is scrolling, wherein the scrolling may include at least one of vertical, horizontal, or diagonal scrolling, and determining a scrolling speed of the webpage based on the scrolling.

In accordance with further aspects of this embodiment, the method may further comprise comparing the scrolling speed to a scrolling threshold, and determining that the scrolling speed is above the scrolling threshold.

In accordance with further aspects of this embodiment, the method may further comprise delivering content to the slot.

In accordance with further aspects of this embodiment, the method may further comprise comparing the scrolling speed to a scrolling threshold, and determining that the scrolling speed is less than the scrolling threshold.

In accordance with further aspects of this embodiment, the method may further comprise queuing content for delivery to the slot, wherein the content may be delivered to the slot when the scrolling speed is determined to be greater than or equal to the scrolling threshold.

In accordance with another embodiment, the techniques may be realized as a system for content delivery comprising a processor configured to determine a slot of a webpage, determine a display area of a web browser displaying the webpage, determine a distance from the slot to a location of the display area, and compare the distance to a first threshold, wherein the distance may be measured in pixels.

In accordance with further aspects of this embodiment, the processor may be further configured to determine that the distance is greater than the first threshold, wherein when the distance is greater than a first threshold, the slot is outside of the display area.

In accordance with further aspects of this embodiment, the processor may be further configured to queue content for delivery to the slot, wherein the content may be delivered to the slot when the distance is determined to be less than the first threshold.

In accordance with further aspects of this embodiment, the processor may be further configured to determine that the distance is less than or equal to the first threshold, wherein when the distance is less than or equal to the first threshold, the slot is within the display area.

In accordance with further aspects of this embodiment, the processor may be further configured to deliver content to the slot.

In accordance with another embodiment, the techniques may be realized as a method of content delivery comprising determining a slot of a webpage, determining a display area of a web browser displaying the webpage, determining that a webpage is scrolling, determining a scrolling speed of the webpage based on the scrolling, and comparing the scrolling speed to a scrolling threshold.

In accordance with further aspects of this embodiment, the method may comprise determining that the scrolling speed is above the scrolling threshold, and queuing content for delivery to the slot, wherein the content may be delivered to the slot when the scrolling speed is determined to be greater than or equal to the scrolling threshold.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIGS. 4A through 4F show bar graphs comparing the performance of the content delivery operation in accordance with one embodiment of the present disclosure.

DETAILED DESCRIPTION OF EMBODIMENTS

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Figure 1:
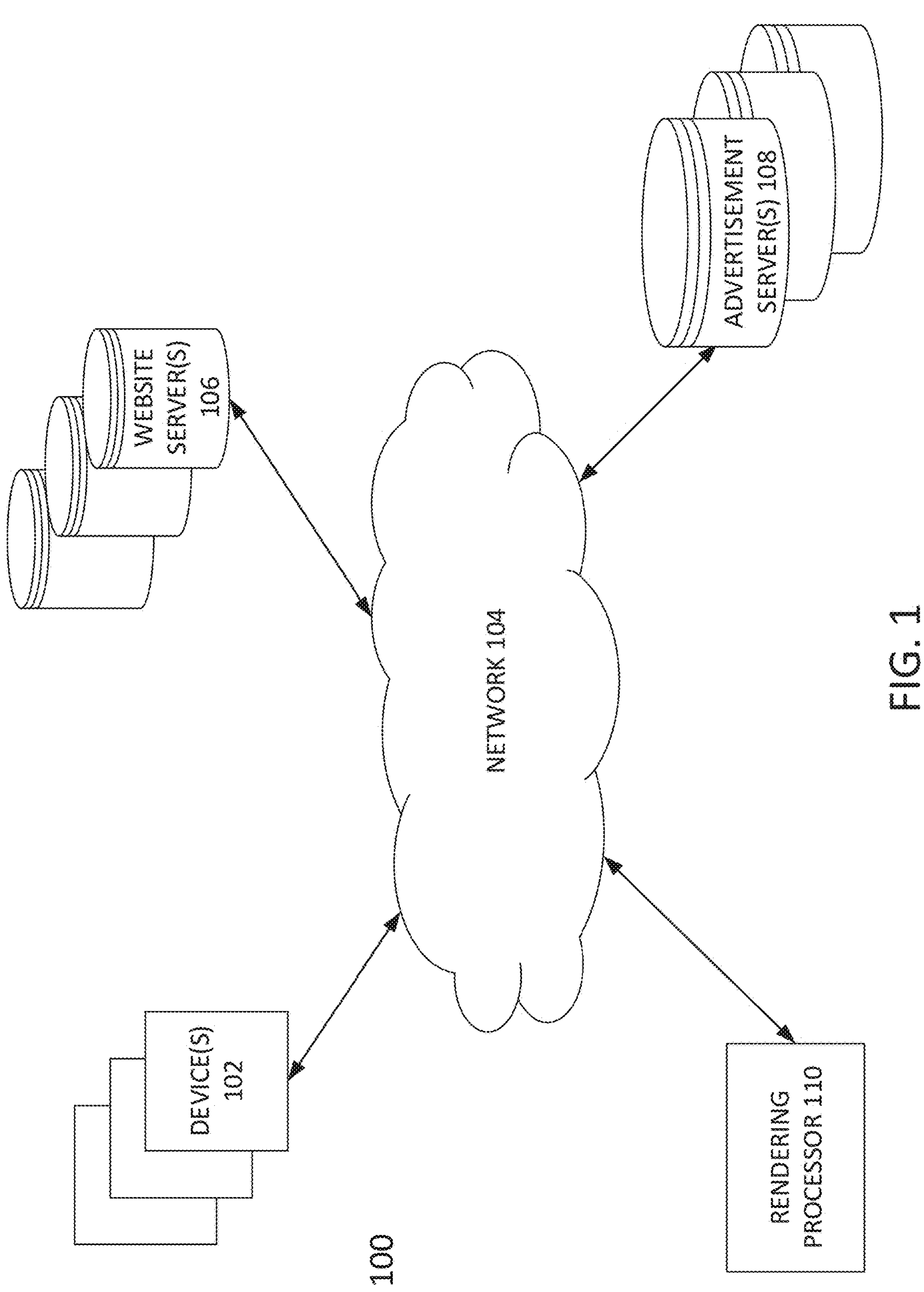
FIG. 1 shows a content delivery system in accordance with one embodiment of the present disclosure

FIG. 1. shows a content delivery system 100 in accordance with one embodiment of the present disclosure. As shown in FIG. 1, system 100 includes one or more devices 102. Device 102 may be, for example, a portable device such as a mobile or cellular phone, tablet computer, laptop computer, or the like. Alternatively, device 102 may be a desktop computer, server, or any other kind of computing device. Device 102 may be used to view content delivered by website server 106 and/or advertisement server 108. Content may be viewed on device 102 via a browser, such as a web browser or internet content browser. Device 102 may have certain requirements for displaying content. For example, device 102 may require that content viewed on it have a certain display resolution. Alternatively or in addition, device 102 may require that content viewed on it have a certain data size and/or dimensional display size.

System 100 also includes network 104. Network 104 may be, for example, the Internet. Network 104 may be formed by a cellular network or a WIFI network. Network 104 may be a local area network (LAN) or a wide area network (WAN). Network 104 may be a wireless or wired network. Network 104 may provide for communication between the various elements of FIG. 1.

System 100 also includes one or more website servers 106. Website server 106 may contain content that corresponds to a particular website. For example, website server 106 may include webpage data for a particular website. Device 102 may access website server 106 via network 104. For example, a device 102 may point its browser to a certain website that has its webpage data stored in website server 106. Website server 106 may then deliver the webpage data to device 102, and device 102 may display the webpage data in its browser.

System 100 may also include one or more advertisement servers 108. Advertisement server 108 may contain advertisement content for delivery to a device 102 alone or with webpage data from website server 106. For example, advertisement server 108 may include video, image, audio-visual, and/or audio advertisement content that is viewed and/or listened to via a browser of device 102 along with webpage data from website server 106. Advertisement server 108 may further include on one or more of supply side platform (SSP) technology that provides the selling on advertisement slots and media space, demand side platform (DSP) technology that allows for the bidding of advertising, and one or multiple libraries associated with SSP and/or DSP. Advertisement server 108 may also include one or more Google Publisher Tag (GPT) libraries, for example.

System 100 may also include rendering processor 110. Rendering processor 110 may be a database, server, desktop computer, laptop computer, portable device, or the like. Rendering processor 110 may communicate via network 104 with advertisement server 108, website server 106, and library database 112. Rendering processor 110 may alternatively be integrated with either advertisement server 108 or website server 106, and be part of the same computing device. Rendering processor 110 may perform various processes to provide improved speed and efficiency in the selection and loading advertising content provided by advertisement server 108 to device 102. Rendering processor 110 may perform processes in an asynchronous or synchronous manner. Rendering processor 110 is explained in further detail in FIG. 2.

Figure 2:
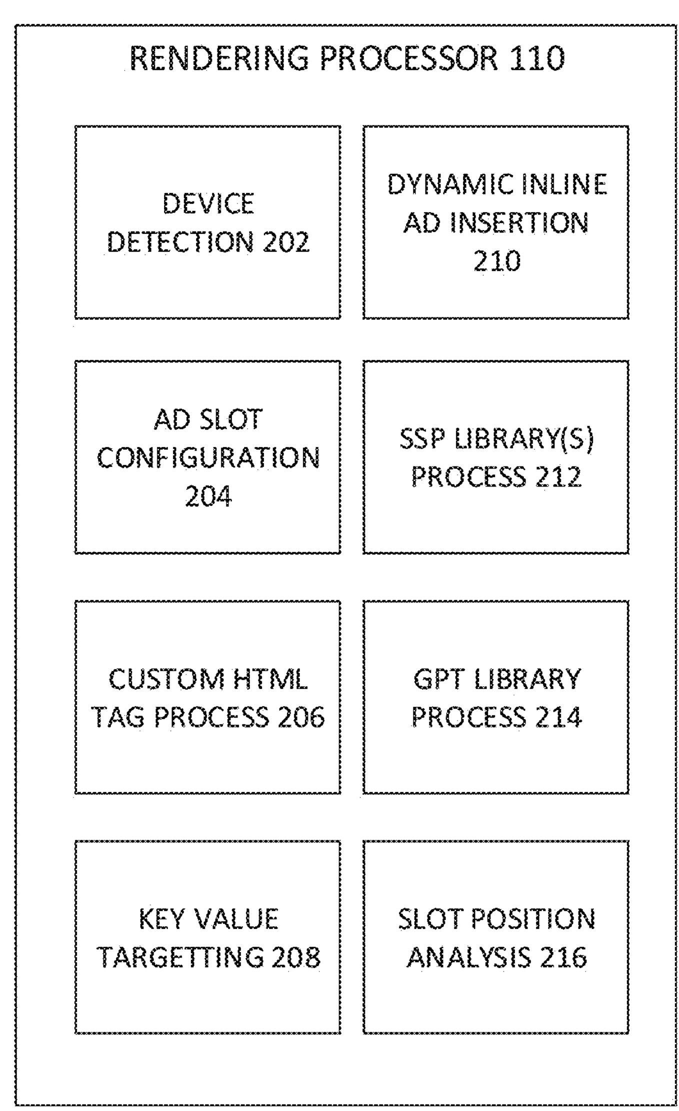
FIG. 2 shows an expanded representation of a rendering processor and the various processes that it performs in accordance with one embodiment of the present disclosure.

FIG. 2 shows an expanded representation of rendering processor 110 and the various processes that it performs in accordance with one embodiment of the present disclosure. As shown by FIG. 2, rendering processor 110 includes a process for device detection 202. During device detection 202, rendering processor 110 detects the device 102 to which advertisement content will be delivered. Rendering processor 110 may render advertising content for any device 102 using javascript, for example. Rendering processor 110 need not use different javascript coding to render for different kinds of devices 102 that have differing content resolution and/or dimension requirements, for example. Instead, rendering processor 110, may use a single javascript coding to render for any kind of device 102.

Rendering processor 110 may further include a process for ad slot configuration 204. Ad slot configuration 204 may include configuring advertisement content for webpages viewed on device 102. For example, rendering processor 110 may use ad slot configuration 204 to call an advertisement with a required resolution and/or dimensional display size for a device 102. If device 102 has a high resolution screen, it may require advertisement content with a high resolution. Moreover, if device 102 has a restricted display window (for example, because it is a tablet computer or mobile phone), device 102 may require advertisement content that has an appropriate dimensional display size. Rendering processor 110 may use ad slot configuration 204 to select appropriate advertising for device 102 that accounts for such characteristics of device 102. Ad slot configuration 204 may also utilize targeting key values when configuring advertising content. For example, ad slot configuration 204 may determine the genre or subject of advertisement content for rendering using key values associated with a device 102. The key values may be found in the cookies, local storage, or other available data resources of device 102.

Ad slot configuration 204 may further determine a time period for displaying advertisement content in an advertising slot. For example, ad slot configuration 204 may set one or more of a start date, start time, end data, and end time for advertisement content in a certain slot. The advertisement content may be automatically replaced in the slot when the time period ends.

Rendering processor 110 may include a custom HTML tag process 206. Custom HTML tag process 206 may include determining custom HTML tags associated with one or more of a browser of device 102, webpage data of website server 106, and advertisement content of advertisement server 108. By recognizing and processing custom HTML tags in custom HTML tag process 206, rendering processor 110 may recognize the requirements of advertising slots associated with webpage data, as well as the requirements of device 102 (such as resolution and display dimension, for example). Moreover, custom HTML tag process 206 may recognize custom HTML tags of advertisement content that reflect when such content is being generated or is ready for display on device 102. Custom HTML tag process 206 may improve the speed at which rendering processor 110 operates because it may reduce the amount of HTML code that must be parsed.

Rendering processor 110 may include key value targeting 208. Rendering processor 110 may include a collection of key values that correspond to certain subjects, genres, and products. Key values may include certain words, website addresses, and/or descriptors, for example. In key value targeting 208, rendering processor 110 may analyze data in the cookies, browsing history, and/or local storage, for example, of a device 102 for data that matches or appropriately corresponds to the collection of key values of rendering processor 110. By performing such analysis, rendering processor 110 may identify advertising content that may be of interest to a user of device 102, and may allow for the selection of such content to be sent to device 102. Therefore, key value targeting 208 may provide that targeted advertisements may be sent to a particular device 102.

New key values may be continuously added to rendering processor 110. These new key values may thereafter be used when analyzing data associated with a device 102. Furthermore, key values are fully customizable and may be edited.

Rendering processor 110 may include a process for dynamic inline ad insertion 210. This process determines when and where a selected advertisement from advertisement server 108 is inserted into the body of a webpage. For example, rendering processor 110 may use this process to determine whether advertising content should be located after a certain number of paragraphs, words, or characters on a webpage, for example. Rendering processor 110 may use dynamic inline ad insertion 210 to determine whether advertising content should be listed throughout a webpage or only in one location of a webpage. For example, the process may determine whether different or the same advertising content should be located throughout a webpage in different locations separated by a certain number of paragraphs, words, or characters, for example.

Moreover, rendering processor 110 may use this process to determine whether advertising content should be located next to image and/or video content on a webpage, or whether advertising content should instead be distanced from image and/or video content by a buffer space, or a certain number of paragraphs, words, or characters on a webpage. Dynamic inline ad insertion 210 may also restrict the amount of advertising content that is displayed on a webpage. For example, for webpages displaying short news articles that have a number of paragraphs, words, or characters below a certain threshold, dynamic inline ad insertion 210 may limit only a single advertisement to the webpage. In contrast, for example, for webpages displaying news articles that are of greater length that have a number of paragraphs, words, or characters above a certain threshold, dynamic inline ad insertion 210 may allow for more than a single advertisement to the webpage.

Rendering processor 110 may include a SSP (supply side platform) library process 212. Here, rendering processor 110 may send a single bid code to advertisement server 106 based on the one or more SSP libraries that advertisement server 106 includes. Advertisement server 106 may perform server to server bidding and deliver an advertisement for insertion into a webpage displayed by a device 102. Because rendering processor 110 need only send a single bid code to advertisement server 106 during SSP library process 212, the speed at which advertisements may be delivered may be increased. Moreover, multiple SSP libraries can be utilized without compromising the speed of advertisement delivery. One or more SSP scripts associated with the SSP libraries may be client side (e.g., at rendering processor 110 or device 102) or server side (e.g., at advertisement server 106) scripts.

Rendering processor 110 may include a GPT (Google Publisher Tag) library process 214. This process may be used with DoubleClick for Publishers (DFP), for example. Here, delivered advertisements from advertisement server 106 may be readied for rendering and publishing to a webpage displayed by a device 102.

Rendering processor 110 may include a process for slot position analysis 216. In slot position analysis 216, rendering processor 110 analyzes and determines the location of an advertisement slot of a loaded webpage, and also analyzes and determines the display area of a device 102 browser displaying the webpage. Rendering processor 110 may recognize when a webpage is being scrolled up, down, and side to side by a user in a browser of device 102, and may determine the viewable display area of a browser. By performing such analysis, rendering processor 110 may determine whether an advertisement slot is located in a viewable display area of a browser or located off-screen in an area of the webpage that is not viewable to a user of device 102. If the advertisement slot is located off-screen, advertising content for that slot is not rendered. However, when the advertisement slot is located within a certain number of pixels to the viewable display area of the browser, or in the viewable display area of the browser, rendering processor 110 may perform its processes to bid and render an advertisement in the advertisement slot. Slot position analysis 216 may allow for improved loading times for webpages because only advertisements in or close to the viewable areas of a browser are displayed. Moreover, advertisements are not wasted by this process because the unnecessary loading of unviewed advertisements is avoided. Additionally, by allowing for the rendering of advertisements that are within a certain number of pixels to the viewable display area of the browser, users of a device 102 may be more likely to see the advertisement because it will likely have loaded by the time the display area is viewed.

Figure 3:
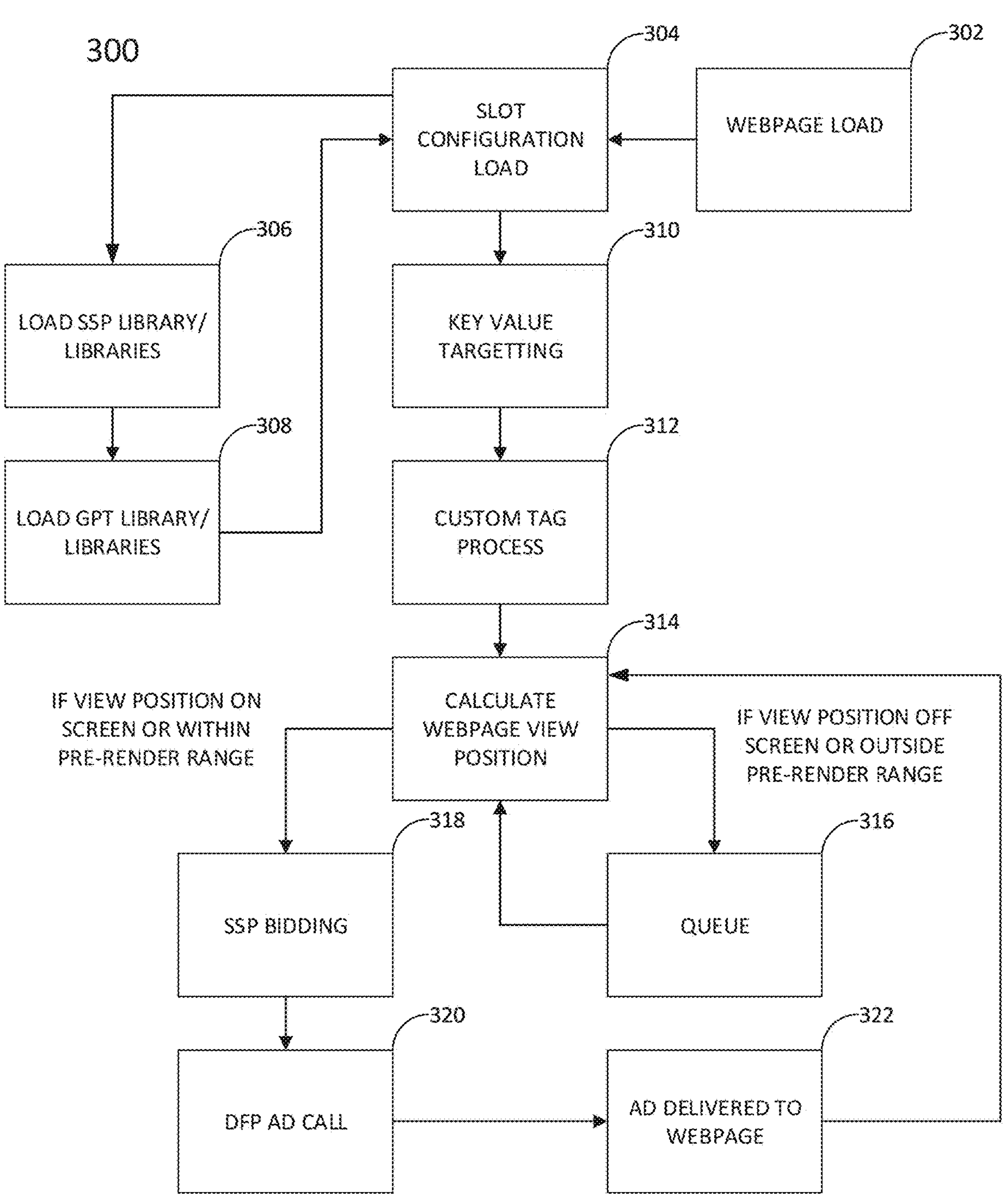
FIG. 3 shows an exemplary flow chart of a content delivery operation in accordance with one embodiment of the present disclosure.

FIG. 3 shows an exemplary flow chart of content delivery operation 300 in accordance with one embodiment of the present disclosure. At step 302 a webpage is loaded on a device, such as device 102 for example. The webpage may be loaded from a server, such as website server 106, for example. When the webpage has loaded on a device, the device includes a cache associated with the webpage. Dependency libraries associated with the webpage and cascading style sheets (CSS) may be loaded asynchronously by a LoaderJS javascript file after the webpage has been loaded. Server side or client side caching for dependency libraries, such as source dependency libraries, may occur.

At step 304, advertisement slot configuration is loaded. Here, one or more advertisement slots positioned on the loaded webpage are configured and readied for receiving advertisement content. At steps 306 and 308, SSP library/libraries and GPT library/libraries are loaded and advertising content is readied for rendering and delivery from advertisement server 108. The advertisement slot configuration allows configuration of the GPT settings in step 308, which may allow for the setting of targeting, size, node, asynchronous or synchronous loading, among other settings. These settings may be coded by javascript. It should be noted that according to certain embodiments, all of the scripts and loadings of the page, scripts, and libraries may occur at the same or substantially the same time, and that server side or client side caching for libraries, such as source dependency libraries, and scripts may occur.

At step 310, key value targeting may be performed. As discussed above with reference to FIG. 2, rendering processor 110 may analyze data in the cookies, browsing history, and/or local storage, for example, of a device 102 for data that matches or appropriately corresponds to the collection of key values of rendering processor 110. By performing such analysis, rendering processor 110 may identify advertising content that may be of interest to a user of device 102, and may allow for the selection of such content to be sent to device 102.

At step 312, a custom tag process occurs. Here, as discussed above in regard to FIG. 2, custom HTML tags associated with one or more of a browser of device 102, webpage data of website server 106, and advertisement content of advertisement server 108 are determined. By recognizing and processing custom HTML tags in custom HTML tag process 206, rendering processor 110 may recognize the requirements of advertising slots associated with webpage data, as well as the requirements of device 102 (such as resolution and display dimension, for example). Moreover, custom HTML tag process 206 may recognize custom HTML tags of advertisement content that reflect when such content is being generated or is ready for display on device 102. After step 312, advertising content is ready to be rendered.

At step 314, the webpage view position of device 102 is determined. As discussed above in regard to FIG. 2, rendering processor 110 analyzes and determines the location of an advertisement slot of a loaded webpage, and also analyzes and determines the display area of a device 102 browser displaying the webpage. Rendering processor 110 may determine whether an advertisement slot is located in a viewable display area of a browser or located off-screen in an area of the webpage that is not viewable to a user of device 102. If the advertisement slot is located off-screen, advertising content for that slot is not rendered and is instead queued at step 316 until the slot is located on screen or within a certain number of pixels to the viewable display area of the browser. Rendering processor 110 may determine that the advertisement slot is located off-screen when the advertisement slot is located outside of a certain number of pixels to the viewable display area of the browser (e.g., outside a pre-render range or greater than a pre-render threshold).

If the advertisement slot is located within a certain number of pixels to the viewable display area of the browser (e.g., inside a pre-render range or less than or equal to a pre-render range threshold), rendering processor 110 may perform its processes to bid and render advertising content in the advertisement slot. Steps 318 and 320 may occur, where SSP bidding and a DFP advertisement call may be performed. The SSP bidding of step 318 may be header SSP bidding, which may provide improved advertising content that is better matched to a user of device 102, but may increase latency and the time it takes to deliver and load advertisements to the loaded webpage. Therefore, SSP bidding of step 318 need not be header SSP bidding. In embodiments of the present disclosure, header bidding scripts may include A9, Index Exchange, Criteo, OpenX, AOL, and FaceBook, for example. These scripts may fetch from live databases and load asynchronously. In an embodiment, if any of the scripts take longer than a preset time value (e.g., 400 ms) to load, then it will be skipped to protect the performance of the system and allow for maximum resulting viewability. If the processes at steps 318 and/or 320 take too long, a direct advertising campaign may instead be provided where cached advertisement scripts and/or other cached data is used to deliver an advertisement to a device 102. For example, if the time expended at steps 318 and/or 320 exceeds a threshold, cached advertisement scripts and/or other cached data may be used to deliver an advertisement to a device 102.

After steps 318 and 320, advertising content is selected and readied for rendering and publishing to the loaded webpage.

It should be noted that the pre-render range may be a certain number of pixels diagonally, vertically, and/or horizontally from an edge, the center, or any other location of an advertisement slot to an edge, the center, or any other location of the viewable display area of the browser, Instead of, or in addition to, the pre-render range analysis at step 316, a scrolling speed may be analyzed by rendering processor 110. For example, rendering processor 110 may estimate how fast a user of a device 102 is scrolling on a webpage of a browser by analyzing how a webpage is scrolled horizontally, vertically, and/or diagonally. Scrolling may be performed by a user touching a touch-screen interface of a device 102 with their finger or a stylus, for example, swiping a touch-screen interface of a device 102 with their finger or a stylus, for example, or by a user operating a computer mouse, keyboard, or other input device associated with device 102, for example. Scrolling may alternatively be performed in some other way by the user, such as by device 102 using detected motion of the user's body or device 102 measuring some other aspect of a user or a user's actions. Using this analysis, rendering processor 110 may determine time at which an advertisement slot that is currently outside of the viewable display area of the browser will be located inside the viewable display area. For example, if the scrolling speed is below a threshold and an advertisement is not likely to be displayed in a viewable display area of the browser within a certain time period, then advertising content for that slot is not rendered and is instead queued at step 316 until the slot is likely to be displayed in a viewable display area of the browser within a certain time period. Alternatively, for example, if the scrolling speed is above or equal to a threshold and an advertisement is likely to be displayed in a viewable display area of the browser within the certain time period, then rendering processor 110 may perform its processes to bid and render advertising content in the advertisement slot and steps 318 and 320 may occur.

The processes and analyses of step 314 may occur automatically. For example, advertisement slots may be automatically prioritized based on the distance of the slot to a viewable display area of a browser and/or the analyzed scrolling speed. For example, if a user of a device 102 has scrolled device 102 such that the viewable display area of its browser is in a center portion of a webpage, advertisement slots in the center portion may be rendered and displayed automatically, while advertisement slots outside of the viewable display area may not be rendered. In another example, if a user of a device 102 has scrolled device 102 at a speed that results in an advertisement being determined as likely present in a viewable display area of the browser, advertisement slots in the viewable display area may be rendered and displayed automatically, while advertisement slots outside of the viewable display area may not be rendered.

The processes of step 314 may help improve the speed at which advertising content is delivered to a webpage and/or the speed at which a webpage loads. This is because the loading of libraries and other scripts is performed in advance of advertisement rendering. The advertisement rendering, which may be data-heavy, is saved until the advertisement is located in a viewable area or is close to a viewable area, as discussed above.

Finally, at step 322, the advertising content is delivered to the loaded webpage to the configured slot(s) that are in the viewable area of a browser of device 102. After the advertising content is delivered to the loaded webpage, the process returns to step 314 and the webpage view position is again calculated. The process then continues again from step 314 for the loaded webpage. If a new webpage is loaded, or the current page is reloaded, the process restarts at step 302.

Content delivery operation 300 therefore may provide computerized real-time and/or near-instant advertising content delivery to computing devices, such as devices 102.

FIGS. 4A through 4F show bar graphs comparing the performance of content delivery operation 300 in accordance with one embodiment of the present disclosure.

FIGS. 4A through 4E show bar graphs comparing the performance of operation 300 with and without header SSP bidding against conventional advertisement content delivery with and without header SSP bidding for various advertisement slots on a webpage. Header SSP bidding may be performed in step 318 of operation 300 as discussed above. As shown by FIGS. 4A through 4E, operation 300 outperformed conventional advertisement content delivery in nearly every advertisement slot, and provided advertisement content delivery with less latency compared to conventional delivery systems.

Figure 4E:
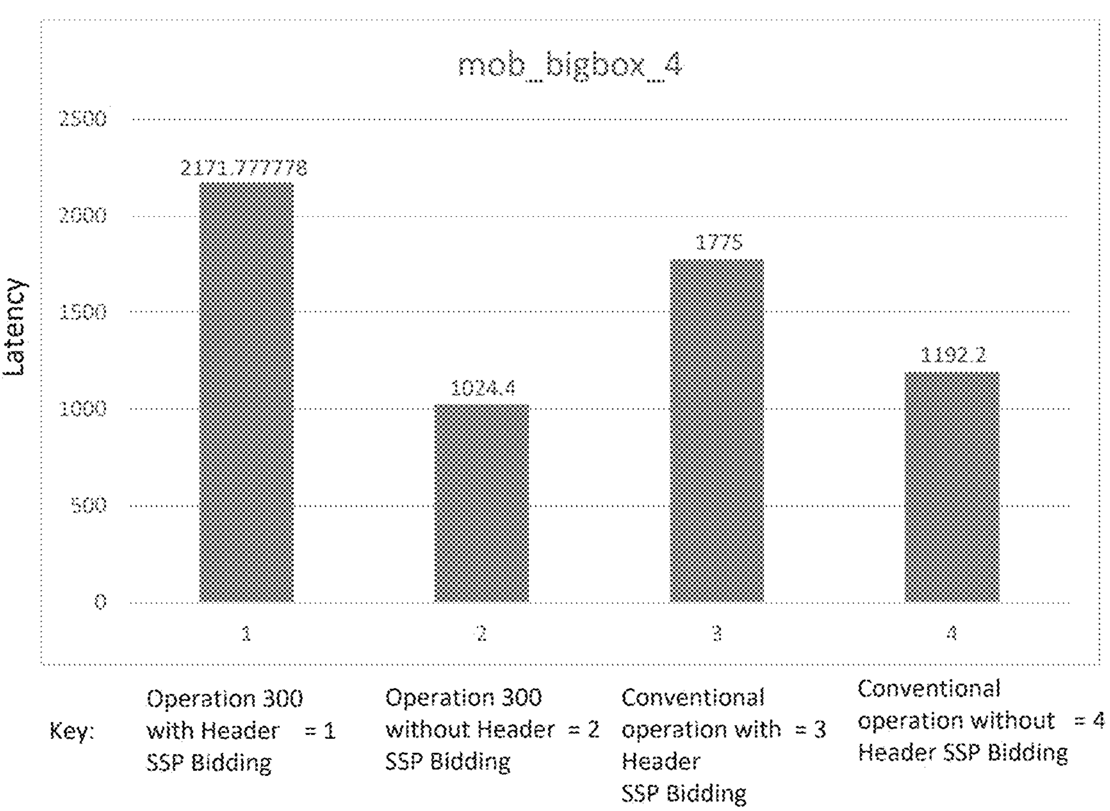
Figure 4F:
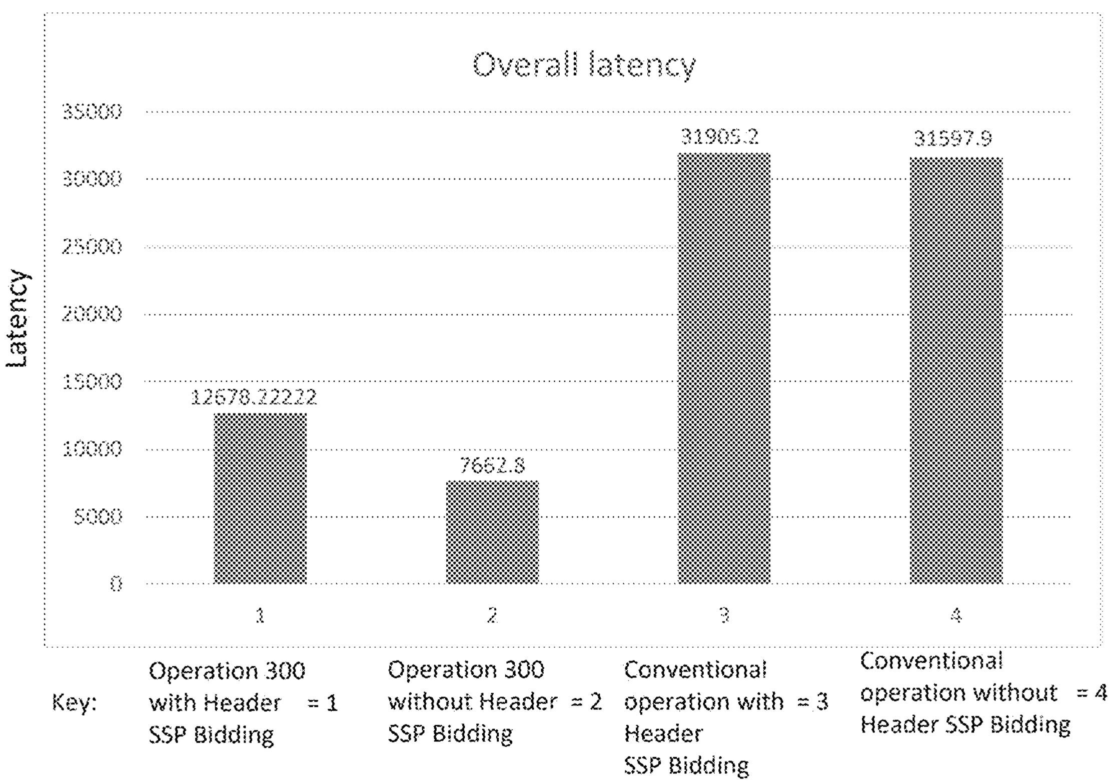

FIG. 4F shows the average overall latency for performance of operation 300 with and without header SSP bidding against conventional advertisement content delivery with and without header SSP bidding for all advertising slots analyzed in FIGS. 4A through 4E. As shown by FIG. 4F, operation 300 without header SSP bidding had an overall average latency that was substantially less than conventional advertisement content delivery systems. Operation 300 with header SSP bidding also performed with substantially less average latency compared to conventional advertisement content delivery systems.

At this point it should be noted that techniques for providing computerized real-time and/or near-instant advertising content delivery to computing devices in accordance with the present disclosure as described above may involve the processing that may be implemented in hardware or software. For example, specific electronic components may be employed in a server or similar or related circuitry for implementing the functions associated with providing computerized real-time and/or near-instant advertising content delivery to computing devices in accordance with the present disclosure as described above. Alternatively, one or more processors operating in accordance with instructions may implement the functions associated with providing computerized real-time and/or near-instant advertising content delivery to computing devices in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of content delivery, performed by a rendering processor in communication via a network with a device, a website server, and an advertisement server, the method comprising:

loading, from the advertisement server, at least one configuration associated with an ad slot for a webpage loaded from the website server onto the device, wherein loading the at least one configuration includes loading advertising libraries and advertising scripts in advance of rendering advertising content or a cached advertisement for the ad slot, wherein the cached advertisement is cached locally at the device;

processing custom HTML tags within the webpage to determine requirements of the ad slot;

processing the custom HTML tags within the webpage to determine at least one of a display resolution and a display dimension of the device;

determining a display area of a web browser displaying the webpage on the device;

determining a distance from the ad slot to a location of the display area;

comparing the distance to a first threshold;

if the distance is less than or equal to the first threshold, selecting the advertising content from the advertisement server based on at least one of the display resolution and the display dimension of the device, wherein the selecting comprises performing an advertisement bidding and an advertisement call;

determining a load time of the advertising content;

comparing the load time to a second threshold;

if the load time is less than or equal to the second threshold, delivering the advertising content to the ad slot; and if the load time is greater than the second threshold, delivering the cached advertisement to the ad slot.

2. The method of claim 1, wherein the ad slot is outside the display area when the distance is greater than the first threshold.

3. The method of claim 1, further comprising:

if the distance is greater than the first threshold, queuing the advertising content for delivery to the ad slot.

4. The method of claim 1, wherein, when the distance is less than or equal to the first threshold, the ad slot is within the display area.

5. The method of claim 1, wherein the distance is a diagonal distance from an edge of the ad slot to the location of the display area, wherein the location of the display area is an edge of the display area.

6. The method of claim 1, wherein the distance is a diagonal distance from the center of the ad slot to the location of the display area, wherein the location of the display area is the center of the display area.

7. The method of claim 1, wherein the distance is at least one of a vertical and horizontal distance from a first location of the ad slot to the location of the display area.

8. The method of claim 1, further comprising:

determining that the webpage is scrolling, wherein the scrolling includes at least one of vertical, horizontal, or diagonal scrolling; and determining a scrolling speed of the webpage based on the scrolling.

9. The method of claim 8, further comprising:

comparing the scrolling speed to a scrolling threshold; and determining when the scrolling speed is above the scrolling threshold.

10. The method of claim 9, further comprising:

when the scrolling speed is determined to be above the scrolling threshold, rendering the advertising content or the cached advertisement for delivery to the ad slot.

11. The method of claim 8, further comprising:

comparing the scrolling speed to a scrolling threshold; and determining when the scrolling speed is less than the scrolling threshold.

12. The method of claim 11, further comprising:

when the scrolling speed is determined to be less than the scrolling threshold, queuing the advertising content or the cached advertisement for delivery to the ad slot, wherein the advertising content or the cached advertisement is delivered to the ad slot when the scrolling speed is determined to be greater than or equal to the scrolling threshold.

13. The method of claim 1, further comprising:

analyzing data associated with the device to identify content of interest, wherein the selecting the advertising content is further based on the content of interest.

14. The method of claim 1, wherein the custom HTML tags have added code functionality that reduces code parsing and increases processing speed of the rendering processor.

15. A system for content delivery, the system comprising:

a rendering processor in communication via a network with a device, a website server, and an advertisement server, the rendering processor configured to:

load, from the advertisement server, at least one configuration associated with an ad slot for a webpage loaded from the website server onto the device, wherein loading the at least one configuration comprises loading advertising libraries and advertising scripts in advance of rendering advertising content or a cached advertisement for the ad slot, wherein the cached advertisement is cached locally at the device;

process custom HTML tags within the webpage to determine requirements of the ad slot;

process the custom HTML tags within the webpage to determine at least one of a display resolution and a display dimension of the device;

determine a display area of a web browser displaying the webpage on the device;

determine a distance from the ad slot to a location of the display area;

compare the distance to a first threshold;

if the distance is less than or equal to the first threshold, select the advertising content from the advertisement server based on at least one of the display resolution and the display dimension of the device, wherein the selecting comprises performing an advertisement bidding and an advertisement call;

determine a load time of the advertising content;

compare the load time to a second threshold;

if the load time is less than or equal to the second threshold, deliver the advertising content to the ad slot; and if the load time is greater than the second threshold, deliver the cached advertisement to the ad slot.

16. The system of claim 15, wherein the ad slot is outside the display area when the distance is greater than the first threshold.

17. The system of claim 15, wherein the rendering processor is further configured to:

queue the advertising content for delivery to the ad slot if the distance is greater than the first threshold.

18. The system of claim 15, wherein, when the distance is less than or equal to the first threshold, the ad slot is within the display area.

19. The system of claim 15, wherein the rendering processor is further configured to:

analyze data associated with the device to identify content of interest, wherein the selecting the advertising content is further based on the content of interest.

20. The system of claim 15, wherein the custom HTML tags have added code functionality that reduces code parsing and increases processing speed of the rendering processor.

21. A method of content delivery, performed by a rendering processor in communication via a network with a device, a website server, and an advertisement server, the method comprising:

loading, from the advertisement server, at least one configuration associated with an ad slot for a webpage loaded from the website server onto the device, wherein loading the at least one configuration includes loading advertising libraries and advertising scripts in advance of rendering advertising content or a cached advertisement for the ad slot, wherein the cached advertisement is cached locally at the device;

processing custom HTML tags within the webpage to determine requirements of the ad slot;

processing the custom HTML tags within the webpage to determine at least one of a display resolution and a display dimension of the device;

determining a display area of a web browser displaying the webpage on the device;

determining that the webpage is scrolling;

determining a scrolling speed of the webpage based on the scrolling;

comparing the scrolling speed to a scrolling threshold;

if the scrolling speed is greater than or equal to the scrolling threshold, selecting the advertising content from the advertisement server based on at least one of the display resolution and the display dimension of the device, wherein the selecting comprises performing an advertisement bidding and an advertisement call;

determining a load time of the advertising content;

comparing the load time to a second threshold;

if the load time is less than or equal to the second threshold, delivering the advertising content to the ad slot; and if the load time is greater than the second threshold, delivering the cached advertisement to the ad slot.

22. The method of claim 21, further comprising:

queuing the advertising content or the cached advertisement for delivery to the ad slot when the scrolling speed is less than the scrolling threshold.

23. The method of claim 21, further comprising:

analyzing data associated with the device to identify content of interest, wherein the selecting the advertising content is further based on the content of interest.

24. The method of claim 21, wherein the custom HTML tags have added code functionality that reduces code parsing and increases processing speed of the rendering processor.

* * * * *